(12) United States Patent
Schutz et al.

(10) Patent No.: US 8,320,277 B2
(45) Date of Patent: Nov. 27, 2012

(54) MULTITOPOLOGY ROUTING METHOD AND SYSTEM

(75) Inventors: Roland Schutz, Gometz le Chatel (FR); Michel Delattre, Boulogne (FR)

(73) Assignee: Thales, Neuilly sur Seine (FR)

( * ) Notice: Subject to any disclaimer, the term of this patent is extended or adjusted under 35 U.S.C. 154(b) by 168 days.

(21) Appl. No.: 12/594,158

(22) PCT Filed: Mar. 26, 2008

(86) PCT No.: PCT/EP2008/053519
§ 371 (c)(1),
(2), (4) Date: Jun. 1, 2010

(87) PCT Pub. No.: WO2008/125437
PCT Pub. Date: Oct. 23, 2008

(65) Prior Publication Data
US 2010/0246587 A1    Sep. 30, 2010

(30) Foreign Application Priority Data
Mar. 30, 2007 (FR) .................................. 07 02346

(51) Int. Cl.
*H04L 12/28* (2006.01)
(52) U.S. Cl. .......................... 370/254; 370/392
(58) Field of Classification Search ............ 370/254, 370/389, 392
See application file for complete search history.

(56) References Cited

U.S. PATENT DOCUMENTS

| 2007/0008882 | A1* | 1/2007 | Oran | 370/229 |
|---|---|---|---|---|
| 2007/0030852 | A1 | 2/2007 | Szczesniak et al. | |
| 2007/0047463 | A1 | 3/2007 | Jarvis et al. | |
| 2008/0056153 | A1* | 3/2008 | Liu | 370/252 |
| 2008/0304472 | A1* | 12/2008 | Gourlay et al. | 370/352 |

OTHER PUBLICATIONS

Hansen A. F. et al. "Resilient Routing Layers for Recovery in Packet Networks," International Conference on Dependable Systems and Networks, Japan, pp. 238-247. (Jun. 28, 2005).
International Search Report from PCT/EP2008/053519, issued Jul. 4, 2008.
Written Opinion from PCT/EP2008/053519, issued Jul. 4, 2008.
International Preliminary Report on Patentability from PCT/EP2008/053519, issued Jul. 15, 2009.

* cited by examiner

*Primary Examiner* — Jung Park
(74) *Attorney, Agent, or Firm* — Stroock & Stroock & Lavan LLP

(57) ABSTRACT

Method and system for routing data streams in a meshed system, in which use is made of multitopology routers each provided with an intelligent module and wherein at least one step is implemented which takes account of the flow objectives associated with a data stream, the intelligent module associated with each multitopology router determines the proportion of resources reserved for the streams established for the various operational importances and a metric of links is calculated for each of the topologies, and each multitopology router driven by its intelligent module determines a routing table for each topology.

18 Claims, 3 Drawing Sheets

Header of an IP packet

MULTITOPOLOGY ROUTING METHOD AND SYSTEM

CROSS REFERENCE TO RELATED APPLICATIONS

The present application is the U.S. National Phase of International Patent Application Serial No. PCT/EP2008/053519, filed on Mar. 26, 2008, which claims the benefit of French patent application Ser. No. 07/02346, filed on Mar. 30, 2007, both of which are hereby incorporated by reference.

FIELD OF THE INVENTION

The invention relates, notably, to a method and system that makes it possible to determine optimum routes for transferring data streams, or information, in a routing system comprising a number of multitopology-type routers, and making it possible to distribute the routes in a meshed network to best busy the resources needed to handle the streams.

The invention applies, for example, to networks that use the Internet protocol IP, the data being transmitted in IP packets.

PRIOR ART

The function of an IP router is to relay an IP packet arriving at one of its interfaces to another interface based on the destination IP address and on a switching table or Forwarding Information Base (FIB). The switching table is constructed from information collected by a routing protocol (identity of the adjacent nodes, state and metrics of the links) and stored in a routing data table, also called Routing Information Base (RIB).

A multitopology-type router is capable of managing more than one routing plan on a single physical topology. For each plan, it maintains a switching table and, when a packet is switched, it selects the switching table according to indicators read in the packet header. The routing plans can be thought of as being superimposed in a certain order. A plan is therefore identified by its level or order number. A plan is characterized by specific values of the link metrics, independent of those of the other plans. The result of this is that such a router calculates, based on routing data, as many switching tables as there are routing plans. In a network made up of such routers, a packet is relayed on each hop according to its destination address and the routing plan to which it belongs, this plan being determined by a characteristic registered in the packet, for example, in the DSCP (Differentiated Services Code-Point) field of its IP packet header. Alongside the OSPF (Open Shortest Path First) routing protocol, there is thus a multitopology OSPF routing described in a standard recently published by the IETF (RFC 4915). The multitopology routers covered by this patent application can therefore be routers that implement a multitopology OSPF routing and a relay mechanism based on several independent routing tables. In a misuse of language, hereinafter, the term "topology" may signify "routing plan".

The prior art discloses numerous routing and resource management methods. Among these, there are:
  signaling protocols: RSVP (Resource ReSerVation Protocol), RSVP-TE (Resource Reservation Protocol: Traffic Engineering), CR-LDP (Constraint-Routing Label Distribution Protocol);
  routing protocols: OSPF (Open Shortest Path First), multitopology OSPF, OSPF-TE (OSPF Traffic. Engineering), CSPF (Constrained Shortest Path First), etc.

However, these various methods do not make it possible to obtain a distributed and auto-adaptive routing solution that provides the streams that use the IP protocol with a quality of service QoS and, should there be a lack of resources, that drives an admission control on the streams according to operational importance. The requirements for obtaining such a solution are notably:
  finding the optimum paths for the information streams through a meshed network by taking into account the resources already reserved on each component of this meshed network,
  reserving resources for identifiable streams, by taking into account both the flow objectives to be met and the importance in maintaining these objectives throughout the life of the stream,
  arbitrating the order of passage of the streams in the event of a lack of resources, by rerouting the existing streams of lesser importance to routes less favorable to maintaining the flow objectives, thus freeing up resources in favor of the important streams,
  reducing, and even prohibiting, the flow of existing streams of low importance, in the event of a general lack of resources, by acting on a signaling intended for the points of entry into the network and for the applications originating the streams;
  handling the information streams in each component of the meshed network according to the resources reserved by the signaling protocol.

SUMMARY OF THE INVENTION

The invention relates to a method of routing data streams in a meshed system, characterized in that it implements multitopology routers, each provided with an intelligent module, and in that it comprises at least the following steps:
  an accounting of the resource requirements to keep to the quantitative and qualitative flow objectives of the accepted streams, the accounting being organized according to the operational importance of the streams,
  a propagation from router to router of the expressed requirements using a switched signaling in a topology and a mapping in each router between topology and operational importance in order to allow for the accounting of the accepted needs,
  said intelligent module uses the accounting of the accepted needs to generate a metric of links for each of the topologies, and in that
  each multitopology router applies said metric to each of its links for each topology, and sends the values to the other routers,
  each multitopology router maintains routing data, with, in particular, the link metrics calculated dynamically by each intelligent module and determines a switching table for each topology,
  each router can be used to propagate the data streams according to the switching table associated with the topology, a topology that is designated by the packet header fields.

The method can include at least the following steps:
  hierarchically organizing the topologies or routing plans managed by the network of multitopology routers, a topology being defined by independent metrics and giving rise to an optimum route calculation,
  assigning resources to each link, these resources being able to be used immaterially by the data packet streams, independently of the topology to which they belong, acting on the metrics of a topology of level n−1, based on a local knowledge of the resources busied by the topologies of level n or of a level higher than n, maintaining separate routing data tables for each topology and switching tables that are also separate for each topology, updating on each router the routing data tables by using, between the routers, a routing protocol common to all the topologies and metrics specific to each topology.

The calculation of the metric can also take into account one of the following characteristics: the bandwidth available for the real time streams, the link transmission delay.

The metric can be modified in levels, the transition from one level to another being protected by hysteresis mechanisms.

A resource management signaling can be used in the method. This signaling can be of RSVP type.

The network is, for example, a communication network supporting the Internet protocol IP and in which a marker indicating the topology in which the packet is routed is arranged in the DSCP field of the data packet header.

The invention also relates to a system for routing data streams in the form of packets, characterized in that it comprises a set of nodes, each node comprising a multitopology router, such a router having a software module adapted to execute the steps of the method described previously.

The system, for example, consists of an administered meshed network comprising agents located at the edge of the network, the function of said agents being to inject and/or consume the reservation signalings in the routing system.

The software module is notably adapted to:
manage the routing protocol internal to the system and the resource reservation protocol,
determine a metric for a link connecting two nodes,
count the resources needed to handle the streams and negotiate modifications in the routes taken by the streams according to the available resources or nodes, and also take into account the priority given to a data stream,
determine the switching table for each configured topology.

The software module can be adapted:
to maintain routing data tables that are separate for each logical topology and switching tables that are also separate for each logical topology,
each routing data table RIB being updated by a common routing protocol collecting metrics specific to each topology,
each switching table FIB being the result of a route calculation based on data from the associated routing data table RIB.

The network supports, for example, the Internet protocol IP and it uses the abovementioned resource reservation protocol RSVP.

BRIEF DESCRIPTION OF THE DRAWINGS

Other characteristics and advantages of the present invention will become more apparent from reading the following description with appended figures which represent.

DETAILED DESCRIPTION OF THE PREFERRED EMBODIMENTS

Figure 1:
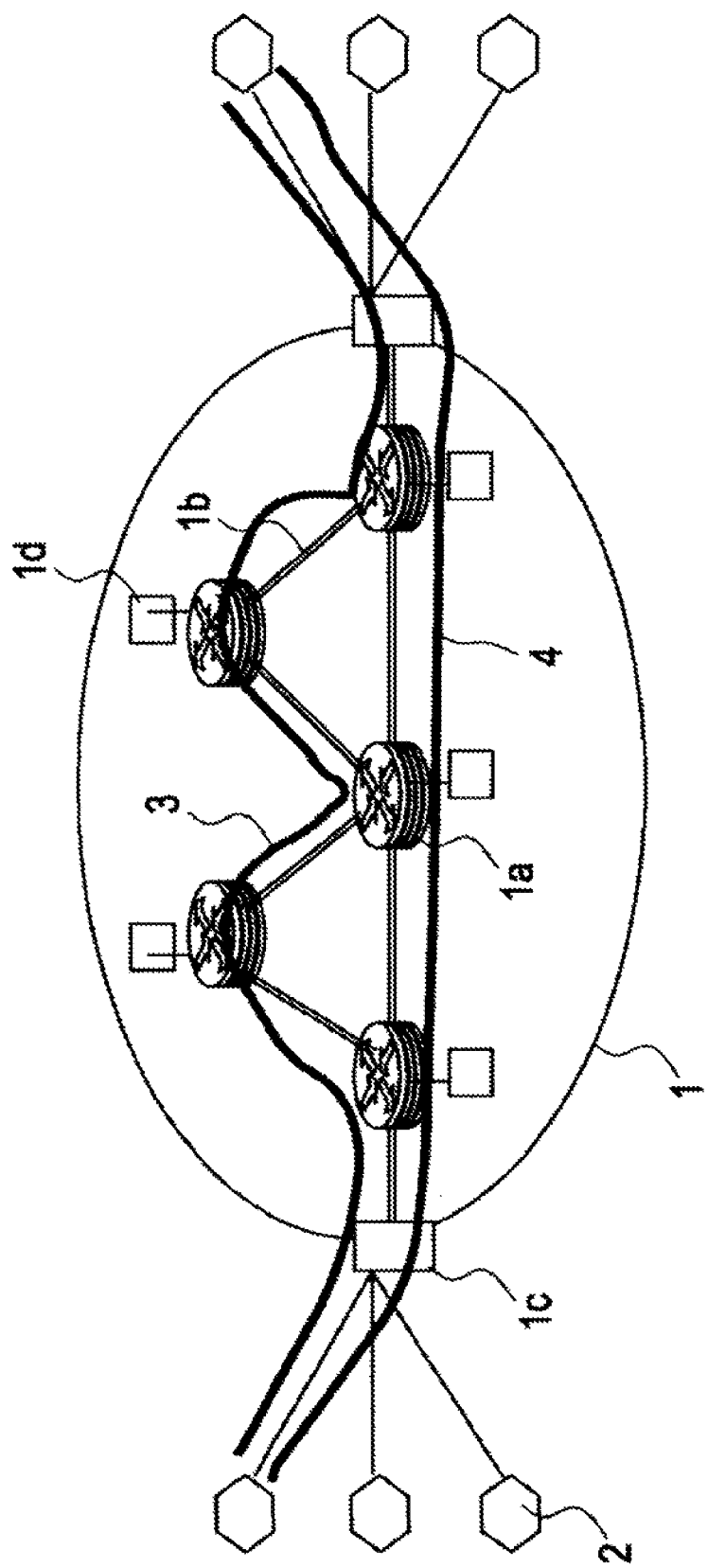
FIG. 1: an example of a network in which the invention can be applied.

FIG. 1 represents an example used to introduce certain concepts used in the present invention:
1) a routing domain 1 or administered meshed network,
2) agents 1c at the edge of this domain notably having the function of injecting and/or consuming reservation signalings in the routing domain 1 under the control of the domain administration. These agents will notably allow the entry of the streams, format them and will interact with the applications originating the streams.

The administration of the routing domain is an entity that plans an initial "knowledge" which will be pushed to all the components of the domain. It does not have to be directly connected to the elements. This knowledge can be embodied, for example, in remanent configuration files in the components of the domain.
3) applications 2 beyond the administrative limits of the routing domain.

The reference 1 designates a routing domain to which the invention is applied. The domain comprises, in this example, a plurality of routing nodes 1a, transmission links 1b between two nodes 1a, agents 1c arranged at the edge of the domain 1 between the applications generating information streams and routing resources (capacity of the links, capacity of the nodes) of the domain, and adaptive management agents 1d, an agent being arranged at a routing node of the domain.

The reference 2 designates applications that have a need to handle information streams with quality of service (QoS) requirements through routing domains, in particular the domain 1 to which the invention is applied. The critical information streams with a flow performance objective are referenced 3 and the non-critical information streams 4.

Figure 2:
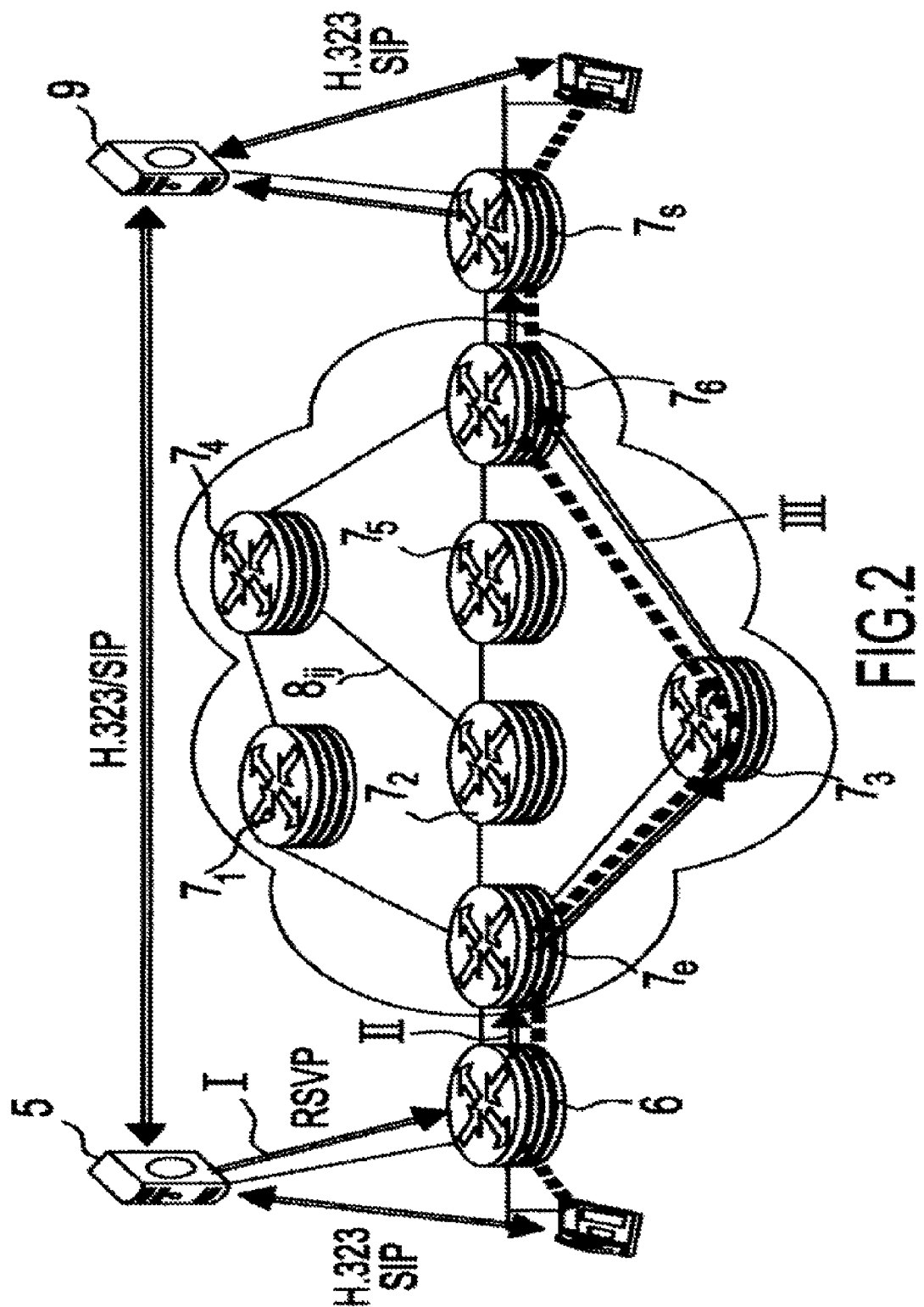
FIG. 2: an example of the implementation of the inventive method.

FIG. 2 shows elements 10 at the edge of the multitopology routing domain that intercept signalings, such as SIP or H.323 coming from applications, and that generate a reservation signaling, for example of RSVP type, in one of the topologies. The level of the topology is chosen according to the importance in maintaining the performance objectives throughout the life of a session. A session of low operational importance will be maintained by resource requests designating objectives to be reached during a determined percentage of time. The data streams of the session will follow an optimum route in a topology of low importance and the calculation of this route will be reviewed according to metrics that will undergo variations due to the events of the topologies of higher importance. The route of the session may be modified without interrupting the service offered to the applications. This rerouting may introduce a transient deviation in the flow characteristics, but will maintain connectivity. For example, a spurious noise in a telephone conversation is quite acceptable because of its rarity.

FIG. 2 represents a nonlimiting exemplary embodiment of the inventive routing method.

The method and the system according to the invention use, notably, multitopology-type routers. These routers comprise, for example, the following elements and functions:
the routing data tables RIB and keeping these tables separate for each topology,
switching tables (FIB) for each topology, and maintaining them. The routing data tables are updated by a common routing protocol and metrics specific to each topology, each FIB is the result of a route calculation specific to the topology that uses the metrics of the topology.

These tables are integrated in multitopology routers and are not represented in the interests of clarity.

In this example, the system for implementing the inventive method comprises: a call server 5, linked to a first router 6 or access router, whose function is explained later in the description. The access router communicates with at least one first multitopology router or entry router 7e via a trunk 8ij or section of the communication network. The system comprises a plurality of multitopology routers 7i, interlinked by trunks 8ij. The last router 7s or exit router is linked to the destination 9.

The inventive idea is based notably on the following assumptions:

- dynamically modifying the metrics of an interior gateway protocol IGP (Interior Gateway Protocol) operating according to a multitopology method and producing, for each topology, a switching table used by the module for relaying the "forwarding engine" data present in the router, according to a method known to those skilled in the art
- supervising the states maintained by the resource reservation protocol RSVP suitable for counting the resources needed to handle the streams, negotiating reductions should there be a lack of resources and taking account of the importance of the streams, an importance that is marked by an identifier in the data packets. This behavior is described, for example, in the document RFC 3181 (accessible via the Internet link www.apps.ietf.org/rfc), and the router will be compatible with this functionality.

From a system point of view, the subject of the invention observes the following principles:

- at the system level, a topology is distinguished by operational importance level, for example a topology corresponding to the command streams, the flow of which is imperative,
- the operational importance may comprise a number of levels. It is possible to define a level for "fast real time" (in the absolute imperative flow sense) information streams, also called "flash",
- a level can be defined for immediate real time (in the imperative flow sense) information streams,
- a level can also be defined for real time urgent (in the critical flow sense) information streams,
- a level can be defined for real time routine (in the normal importance flow sense) information streams,
- a base level can be defined for non-real time information streams (flow that can be delayed).

The number of levels is determined, for example, according to the target application.

The applications that generate the real time streams involve agents 1c (FIG. 1) situated at the edge of the network that are responsible for initiating the resource reservation method, within the appropriate topology, according to the operational importance level of the stream.

The resource reservation is propagated through the core of the network (that is, through the routing nodes of the domain and the trunks) and follows, from the source to the destination, on each hop, the path present in the switching table corresponding to the operational importance level for the resource reservation transmission. This method is implemented by each router that is part of the core of the network.

The software or intelligent module associated with each multitopology router periodically determines the proportion of resources busied by the streams accepted for the different operational importance levels, that is, for the different topologies, and calculates a link metric for each of the topologies. The software samples, at a sufficiently high pace, the states to ensure that the time constant of the overall system is good, in relation to the average life of the sessions. The preparation of the metric is based, for example, on the following principles:

- preparation of the metric specific to a topology for example takes into account the resources reserved by the streams conveyed on the topologies of strictly higher operational importance,
- the calculation of the metric can also take into account: the bandwidth available for the real time streams, the link transmission delay,
- the metric changes by level. The transition from one level to another is protected by hysteresis mechanisms that contribute to the stability of the metric and therefore the routing decisions therefrom.

The inventive method executes, for example, the following steps:

- hierarchically organizing topologies that can be superimposed within one and the same multitopology router, a topology being defined by independent metrics and giving rise to an optimum route calculation, a superimposition being a use of a single physical topology,
- deducting the resources busied in each topology from the resources assigned to the physical topology,
- acting on the metrics of a topology of level n−1, based on the local knowledge of the resources busied by the topologies of level n or of level higher than n,
- maintaining separate routing data tables for each logical topology and switching tables, also separate, for each logical topology,
- updating the routing data tables RIB using a common routing protocol and metrics specific to each topology.

The control intelligent module can be linked to a resource manager when the links between multitopology routers are multipoint links. A representative example is that of links relayed by satellite in which a set of nodes are all directly interconnected using the satellite relay. A dynamic sharing of the radio resources between all of these nodes is then orchestrated by a radio resource manager which distributes the radio resources that embody the multipoint link as and when required by each of the nodes. The relationship between the control modules and this radio resource manager enables each of the intelligent modules associated with the multitopology routers linked by a multipoint link to know the remaining available capacity of the multipoint link and how the occupancy of this link is distributed by operational importance.

The resource management signaling packets contain, for example, the identification of the flow objectives and the identification of the importance in maintaining these objectives during the life of a stream. This importance is bijected with a topology (characterized by metrics that are specific to it) over in which the data packets must be transmitted. The data packets carry in their header an indication enabling relaying within a topology. This indication is present, for example, in a specific field DSCP of the data packet that is coded as follows, for example:

"101001" for the rapid real time (flash) topology,
"101010" for the immediate real time topology,
"101011" for the urgent stream real time topology,
"101100" for the routine real time topology.

Use of IP version 6 offers numerous additional header fields for coding these topology identifiers.

In a more general case, the topology identifiers can also be deduced by each router from the packet reception conditions (frequency, time slot, etc.).

The streams transmitted over the topologies with real time flow objectives are handled via the low-latency queue and obtain the same level of quality, regardless of the operational importance associated with them.

The exemplary system described in FIG. 2 operates, for example, in the manner described below. The user terminal notably has the function of managing the signaling protocol and the media streams (stream I represented by a dotted line in FIG. 2).

The server 5 (agent) is adapted to:
- check the access rights from a directory database and, if necessary, after checking the identity and the authenticity of the user, and validating a level of operational importance of the communication from the initial request from the user and its authorized prerogatives
- transmit the signaling to the server which connects the caller taking into account the caller's location (arrows II)
- generate the resource reservation on the topology concerned (arrows III)
- check the behavior of the access router (checking the authorization to send a stream, checking the DSCP marking with the value corresponding to the chosen topology, etc.). If a communication is preempted, then the server asks the router to mark the stream "best effort", until another resource reservation request is transmitted successfully.

The access router 7e is responsible, notably, for:
- transmitting the RSVP packets over the appropriate topology to the destination,
- ensuring the relative relay priority of the user streams according to what is required for this micro-stream,
- marking the packets of a multimedia-type stream, for example, with the correct DSCP, in order to ensure that this stream will be transmitted over the right topology and will use the same route as the RSVP generated by the server.

A multitopology router, associated with an intelligent module generating the link metrics, notably has the following functions:
- keeping the routing database up to date for each topology configured in the system, in particular, the metrics specific to the topology,
- balancing the loads on the topologies through the decisions of the intelligent module which dynamically modifies the link metrics in each router taking into account, for example:
  link characteristics (latency, reliability, etc.),
  resources reserved by higher operational priorities,
- transmitting the packets according to the appropriate switching table in accordance with the DSCP field,
- managing resource reservation on the trunks or sections of the network for the streams from the users,
- managing preemption of the user streams according to standard RFC 3181, for example,
- managing step-by-step relaying according to the DiffServ (differentiated services) principles; the real time multimedia streams are transmitted through the low-latency queue.

In the context of an application in a network supporting the IP protocol and using the resource reservation RSVP, the method according to the invention is operates, for example, in the manner described hereinbelow.

The method takes into account the importance in keeping to the stream flow objectives, and it assigns a topology, characterized by metrics that are specific to it, to each level of operational importance, and a value for the DSCP field in the packet header. In this way, the relaying module will use, according to the information contained in the DSCP field, a switching table corresponding to the given topology, said table indicating the most effective path for transmitting a data packet in an IP network.

Resource reservation is based, for example, on the standard RSVP signaling or any other signaling having the same characteristics.

The resource reservation level is used by the intelligent module which calculates, for a given topology, the metric of each link according to the reservations made for streams transmitted over the higher level topologies.

After having calculated the metric of the link assigned to a topology, the intelligent software updates the local configuration parameters of the multitopology router and the routing protocol will take account of the new metric values, will broadcast these values to the other routers, directly for the routers separated by one hop or indirectly for the more distant routers and, if necessary, it updates the switching table.

The use of a resource management signaling makes it possible notably to provide a knowledge of the requirement to be handled to the transmission systems in order for them to be able to optimize their transmission service, this optimization possibly being a choice of modulation, of coding, of antenna processing. This touches on the concept of radio resource manager introduced hereinbelow. The transmission system is not necessarily a point-to-point link: it can be a satellite system, an airport system, an IEEE 802.11-type WiFi network, an IEEE 802.16-type WiMax cell. A central decision member dynamically distributes the radio resources between the participants is to the multipoint link according to the requirements and environmental conditions—interference, propagation conditions, reception conditions; these systems incorporate "coding", "modulation" and "antenna" portions, these portions can be adapted and it is the radio resource manager that orchestrates this adaptation in order to obtain the optimization of the radio segment for each identified stream, provide an indication, to the agents at the edge and, by ricochet, to the applications, concerning the availability of the stream handling service.

Figure 3:
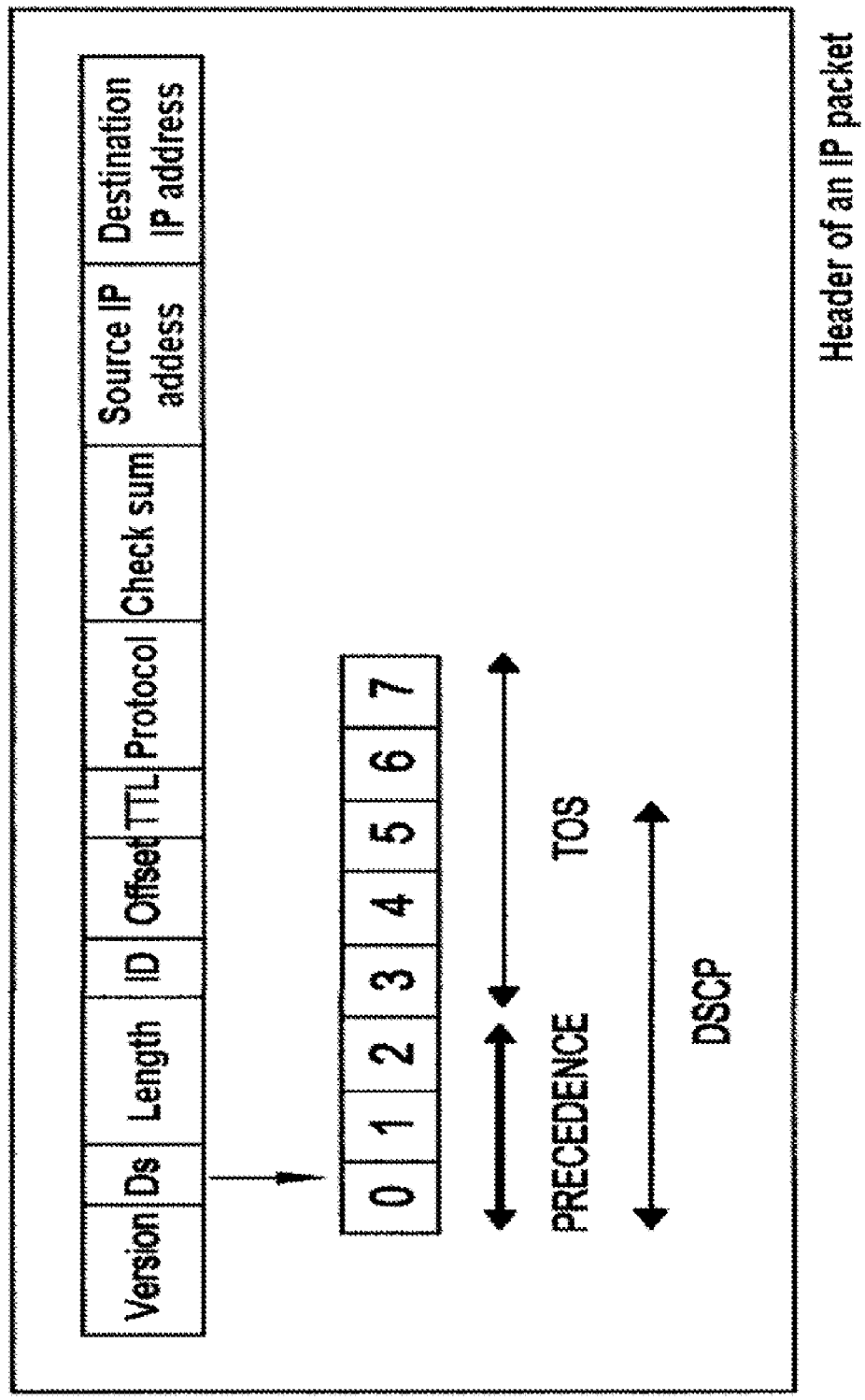
FIG. 3: an exemplary data structure for expressing, within an information packet, flow handling performance objectives.

FIG. 3 reviews the structure of an IP packet header, notably the presence of a DSCP field, a field coded on the first 6 bits of the DS field for broadcasting services in a network implementing Diffserv.

Generally, each information packet is accompanied with markers or identifiers that identify 2 concepts:
1) the flow profile to be observed,
2) the importance in maintaining the flow objectives.

These identifiers can either be borne by the packet header as described in the exemplary IP version 4 packet (example in FIG. 3), or be deduced at each node of the network from the packet reception conditions (radio or optical frequency, time slot, or information transmitted between nodes and correlated with the packet).

Advantages

The method and the system that are the subjects of the invention offer notably the following advantages:
- finding and adapting an optimum path or route for the data streams through a meshed network taking into account the resources reserved previously and the importance in maintaining the flow objectives of the streams attached to these reserved resources,
- transmitting the information stream through the meshed network over point-to-point or multipoint sections or trunks in which the resources have been reserved for this identified stream (the reservation signaling gives the identification rules applied to the data packets to be transmitted).

The routers used for this solution are routers that apply, for example, the principles and protocols published by the IETF and including the RSVP and multitopology OSPF services; the solution offers a higher robustness because of a loose coupling with the control module responsible for calculating the metrics and for the reservation decisions, The solution incorporates in the routing domain a new dimension which is the operational importance. Thanks to the overall behavior, the streams that have a high importance level will obtain the most suitable resources for a specific communication.

The invention claimed is:

1. A multitopology router to route allowed data streams in a meshed system, the multitopology router comprising:
a processor coupled to a memory, the memory storing a plurality of topologies and a series of steps to route allowed data streams within said topologies;
wherein the processor is programmed to perform the following steps, comprising:
recording resource requirements used to provide quantitative and qualitative flow objectives of allowed data streams in order to produce an accounting, the accounting being organized according to an operational importance of the allowed data streams;
propagating to another router the resource requirements by use of a switched signaling for one of said plurality of topologies and a map in the router between said topology and the operational importance, used to produce the accounting of the allowed data streams;
generating link metrics for one or more of said plurality of topologies by use of an intelligent module and the accounting;
dynamically calculating said link metrics by one or more intelligent modules, in order to maintain routing data by one or more multitopology routers;
determining a switching table for one or more of said plurality of topologies;
propagating the allowed data streams by use of the switching table associated with the topology;
hierarchically organizing the plurality of topologies managed by a network of multitopology routers, wherein one of said plurality of topologies comprises links and independent link metrics, and is used to produce an optimum route calculation;
assigning assigned resources to one or more links, the assigned resources being used by the data streams, independently of the topology to which they belong;
acting on link metrics of a topology of level n−1, based on local knowledge of resources used by topologies of a level higher than n−1;
maintaining separate routing data for one or more of said plurality of topologies;
maintaining separate switching tables for one or more of said plurality of topologies; and
updating routing data of one or more multitopology routers by using, between the multitopology routers, an all-topology routing protocol and link metrics specific to one or more of the plurality of topologies.

2. The multitopology router as claimed in claim 1, wherein the step of dynamically calculating the link metrics takes into account at least one of the bandwidth available for real time streams and a link transmission delay.

3. The multitopology router as claimed in claim 1, wherein the switched signaling comprises a resource management signaling.

4. The multitopology router as claimed in claim 3, wherein the switched signaling comprises an RSVP-type signaling.

5. The multitopology router as claimed in claim 1, wherein:
the network comprises a communication network that supports Internet protocol IP; and
a DSCP data packet field contains a marker indicating the operational importance of the allowed data streams.

6. The multitopology router as claimed in claim 1, wherein the link metrics are modified in levels, a transition from one level to another being protected by hysteresis mechanisms.

7. A multitopology router to route allowed data streams in a meshed system, the multitopology router comprising:
a processor coupled to a memory, the memory storing a plurality of topologies and a series of steps to route allowed data streams within said topologies;
wherein the processor is programmed to perform the steps, comprising:
recording resource requirements used to provide quantitative and qualitative flow objectives of allowed data streams in order to produce an accounting, the accounting being organized according to an operational importance of the allowed data streams;
propagating to another router the resource requirements by use of a switched signaling for one of said plurality of topologies and a map in the router between said topology and the operational importance, used to produce the accounting of the allowed data streams;
generating link metrics for one or more of said plurality of topologies by use of an intelligent module and the accounting;
dynamically calculating said link metrics by one or more intelligent modules, in order to maintain routing data by one or more multitopology routers;
determining a switching table for one or more of said plurality of topologies; and
propagating the allowed data streams by use of the switching table associated with the topology;
wherein the link metrics are modified in levels, a transition from one level to another being protected by hysteresis mechanisms.

8. The multitopology router as claimed in claim 7, wherein the step of dynamically calculating the link metrics takes into account at least one of the bandwidth available for real time streams and a link transmission delay.

9. The multitopology router as claimed in claim 7, wherein the processor is programmed to further performing the following steps, comprising:
hierarchically organizing the plurality of topologies managed by a network of multitopology routers, wherein one of said plurality of topologies comprises links and independent link metrics, and is used to produce an optimum route calculation;
assigning assigned resources to one or more links, the assigned resources being used by the data streams, independently of the topology to which they belong;
acting on link metrics of a topology of level n−−1, based on local knowledge of resources used by topologies of a level higher than n−1;
maintaining separate routing data for one or more of said plurality of topologies;
maintaining separate switching tables for one or more of said plurality of topologies; and
updating routing data of one or more multitopology routers by using, between the multitopology routers, an all-topology routing protocol and link metrics specific to one or more of the plurality of topologies.

10. The multitopology router as claimed in claim 7, wherein the switched signaling comprises a resource management signaling.

11. The multitopology router as claimed in claim 10, wherein the switched signaling comprises an RSVP-type signaling.

12. The multitopology router as claimed in claim 7, wherein:
the network comprises a communication network that supports Internet protocol IP; and
a DSCP data packet field contains a marker indicating the operational importance of the allowed data streams.

13. A routing system for routing data streams as packets between a plurality of nodes, said node having a multitopology router, the multitopology router comprising:
a processor coupled to a memory, the memory storing a plurality of topologies and a series of steps to route allowed data streams within said topologies;
wherein the processor is programmed to perform the following steps, comprising:
recording resource requirements used to provide quantitative and qualitative flow objectives of allowed data streams in order to produce an accounting, the accounting being organized according to an operational importance of the allowed data streams;
propagating to another router the resource requirements by use of a switched signaling for said topology and a map in the router between said topology and the operational importance, used to produce the accounting of the allowed data streams;
generating link metrics for one or more of the plurality of topologies by use of an intelligent module and the accounting;
dynamically calculating said link metrics by one or more intelligent modules, in order to maintain routing data by one or more multitopology routers;
determining a switching table for one or more of the plurality of topologies;
propagating the allowed data streams by use of the switching table associated with the topology;
maintaining routing data tables RIB that are separate for one or more logical topology and switching tables FIB that are also separate for one or more logical topologies; and
updating a routing data table by a common routing protocol and link metrics specific to one or more of the plurality of topologies.

14. The routing system as claimed in claim 13, wherein the routing system supports an Internet protocol IP and in that it uses a resource reservation protocol RSVP.

15. The routing system as claimed in claim 13, wherein the system further comprises:
an administered meshed network; and
agents located at an edge of the administered meshed network, wherein said agents being configured to performing one of injecting or using a reservation signaling in the routing system.

16. A routing system for routing data streams as packets between a plurality of nodes, said node having a multitopology router, the multitopology router comprising:
a processor coupled to a memory, the memory storing a plurality of topologies and a series of steps to route allowed data streams within said topologies;
wherein the processor is programmed to perform the following steps, comprising:
recording resource requirements used to provide quantitative and qualitative flow objectives of allowed data streams in order to produce an accounting, the accounting being organized according to an operational importance of the allowed data streams;
propagating to another router the resource requirements by use of a switched signaling for said topology and a map in the router between said topology and the operational importance, used to produce the accounting of the allowed data streams;
generating link metrics for one or more of the plurality of topologies by use of an intelligent module and the accounting;
dynamically calculating said link metrics by one or more intelligent modules, in order to maintain routing data by one or more multitopology routers;
determining a switching table for one or more of the plurality of topologies; and
propagating the allowed data streams by use of the switching table associated with the topology;
wherein the system further comprises:
an administered meshed network; and
agents located at an edge of the administered meshed network, wherein said agents being configured to performing one of injecting or using a reservation signaling in the routing system.

17. The routing system as claimed in claim 16, wherein the processor is further programmed to perform the following steps:
maintaining routing data tables RIB that are separate for one or more logical topology and switching tables FIB that are also separate for one or more logical topologies; and
updating a routing data table by a common routing protocol and link metrics specific to one or more of the plurality of topologies.

18. The routing system as claimed in claim 16, wherein the routing system supports an Internet protocol IP and in that it uses a resource reservation protocol RSVP.

* * * * *